(12) United States Patent
Kim et al.

(10) Patent No.: US 11,220,156 B2
(45) Date of Patent: Jan. 11, 2022

(54) AIR CONDITIONER FOR VEHICLE

(71) Applicant: HANON SYSTEMS, Daejeon (KR)

(72) Inventors: Young Ju Kim, Daejeon (KR); Seok Kim, Daejeon (KR); Sung Jin Kim, Daejeon (KR); Young In Kim, Daejeon (KR); Boo Yong Um, Daejeon (KR); Chan Young Lee, Daejeon (KR); Byeong Ha Lee, Daejeon (KR); Seung Hak Hue, Daejeon (KR); Jae O Jung, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 371 days.

(21) Appl. No.: 16/136,781

(22) Filed: Sep. 20, 2018

(65) Prior Publication Data

US 2019/0092125 A1  Mar. 28, 2019

(30) Foreign Application Priority Data

Sep. 25, 2017 (KR) .......................... 10-2017-0123203
Aug. 31, 2018 (KR) .......................... 10-2018-0103160

(51) Int. Cl.
*B60H 1/00* (2006.01)

(52) U.S. Cl.
CPC ...... *B60H 1/00557* (2013.01); *B60H 1/00521* (2013.01); *B60H 1/00528* (2013.01); *B60H 1/00578* (2013.01); *B60H 1/00671* (2013.01); *B60H 2001/007* (2013.01); *B60H 2001/00621* (2013.01)

(58) Field of Classification Search
CPC .............. B60H 1/0051; B60H 1/00528; B60H 1/0057; B60H 1/00578; B60H 1/00642; B60H 1/00671; B60H 2001/00621; B60H 2001/007; F16C 1/18
USPC ...................... 137/351; 236/49.5; 454/69, 73
See application file for complete search history.

(56) References Cited

U.S. PATENT DOCUMENTS

| 4,907,553 | A  | * | 3/1990 | Porter | .................... | B60K 28/16 123/400 |
| 5,235,866 | A  | * | 8/1993 | Truman | ............. | B60H 1/00578 165/202 |
| 8,173,923 | B2 | * | 5/2012 | Lee | .......................... | G05G 7/10 200/543 |

(Continued)

FOREIGN PATENT DOCUMENTS

| KR | 1 01467263 B1 | 12/2014 | |
| WO | WO-2013125184 A1 * | 8/2013 | ......... B60H 1/00578 |

*Primary Examiner* — Kevin F Murphy
*Assistant Examiner* — Jonathan J Waddy
(74) *Attorney, Agent, or Firm* — Dickinson Wright PLLC

(57) ABSTRACT

The present invention relates to an air conditioner for a vehicle, in which a means for fixing a cable connecting device is disposed integrally with an air-conditioning case, thereby having an optimized installation location, keeping rigidity, achieving weight lightening, and enhancing assemblability. The air conditioner is to condition air in the interior of the vehicle by heating or cooling indoor air, and includes: a cable connecting device for connecting an actuating means of a controller of the vehicle to actuate a door inside an air-conditioning case with an actuating means of the air-conditioning case by a cable; and a cable fixing part for fixing the cable connecting device to the air-conditioning case.

5 Claims, 15 Drawing Sheets

(56) References Cited

U.S. PATENT DOCUMENTS

2010/0192721 A1* 8/2010 Goupil, Jr. ......... B60H 1/00578
74/501.5 R
2014/0208885 A1* 7/2014 Nicole' ................ F16C 1/106
74/500.5

* cited by examiner

PRIOR ART

PRIOR ART

AIR CONDITIONER FOR VEHICLE

CROSS-REFERENCE TO RELATED APPLICATIONS

This application claims the benefit and priority of Korean Patent Application No. 10-2017-0123203, filed Sep. 25, 2017 and Korean Patent Application No. 10-2018-0103160 filed Aug. 31, 2018. The entire disclosures of each of the above applications are incorporated herein by reference.

BACKGROUND OF THE INVENTION

Field of the Invention

The present invention relates to an air conditioner for a vehicle, and more particularly, to an air conditioner for a vehicle including a cable pulley assembly, which is a driving unit for rotating and operating a door inside an air-conditioning case.

Background

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

FIG. 1 is a sectional view showing a conventional air conditioner for a vehicle. As shown in FIG. 1, the conventional air conditioner 1 for a vehicle includes an air-conditioning case 10, a blower (not shown), an evaporator 2, a heater core 3, and a temperature adjusting door 15.

The air-conditioning case 10 includes an air inflow port 11 formed at an inlet side, and a defrost vent 12a, a face vent 12b, and a floor vent 12c formed at an outlet side and adjusted in the degree of opening by mode doors 16. The blower is connected to the air inflow port 11 of the air-conditioning case 10 to blow indoor air or outdoor air.

The evaporator 2 and the heater core 3 are mounted inside the air-conditioning case 10 in order. The temperature adjusting door 15 is mounted between the evaporator 2 and the heater core 3 to adjust the degree of opening of a cold air passageway bypassing the heater core 3 and a warm air passage passing through the heater core 3.

The mode door 16 includes a defrost door for adjusting the degree of opening of the defrost vent 12a, a face door for adjusting the degree of opening of the face vent 12b, and a floor door for adjusting the degree of opening of the floor vent 12c. The temperature adjusting door 15 and the mode doors 16 are connected to an actuator mounted on the outer face of the air-conditioning case 10 and rotates to adjust the degree of opening of the cold air passageway and the warm air passageway or adjust the degree of opening of passageways facing the vents 12a to 12c.

Korean Patent No. 10-1467263 (patent publication on Dec. 1, 2014) discloses a cable connecting apparatus of a controller for an air conditioner in a vehicle. FIG. 2 is a side view of an air-conditioning case on which a conventional cable connecting apparatus is mounted.

Referring to FIG. 2, the temperature adjusting door 15 and the mode doors 16 are adjusted in the degree of opening by an arm 28, a lever 25, and a cam 21 mounted on the outer surface of the air-conditioning case 10. Not only the mode doors 16 but also the temperature adjusting door 15 can be adjusted through the arm 28, the lever 25, and the cam 21.

The cam 21 is rotatably combined with the outer surface of the air-conditioning case, and has a slot 22. The arm 28 is mounted on the outer surface of the air-conditioning case, and directly connected with rotary shafts of the doors so as to be rotated with the doors 16. The lever 25 is located between the cam 21 and the arm 28, and is rotatably combined with the outer surface of the air-conditioning case 10. One end portion of the lever 25 is slidably combined with the slot 22 through a pin 26, and the other end portion is rotatably combined with the arm 28 to transfer rotary power receiving from the cam 21 to the arm 28.

In order to control the air conditioner, a controller is mounted on a center fascia panel of the vehicle. The controller has a structure that a switch is mounted on a housing. A cable connecting device 50 is mounted on a rear side of the housing to operate a cable 53 when a knob is rotated. Moreover, the cable connecting device 50 connects an actuating means of a vehicle controller and an actuating means of the air-conditioning case 10 by a cable 53, of which the outer circumferential surface is surrounded by a tube 31, in order to operate the door in the air-conditioning case 10.

The cable connecting device 50 includes: a pulley receiving part formed therein so that a pulley 52 is rotatably inserted into the pulley receiving part; and a casing 51 disposed at one side thereof so that one end portion of the cable 53 is inserted into the pulley receiving part. A detent protrusion is elastically mounted inside the casing 51 through an elastic member, and a detent part protruding from one side of the pulley 52 and having a plurality of detent grooves 54 formed in a circumferential direction on the outer circumferential surface so that the detent protrusion is resiliently caught to the detent part.

As described above, the air conditioner of the manual type using the cable has a disadvantage in that the cable connecting device 50 may be damaged or lost when it is conveyed together with the controller due to delivery. Furthermore, the air conditioner of a manual type using the cable has another disadvantage in that conveyance costs increase since it needs additional structure for protecting the device when the cable connecting device 50 is delivered.

Additionally, in the final package assembly step, the air conditioner of the manual type is delivered in a state that the cable connecting device 50 is mounted on the outer face of the air-conditioning case 10. The cable connecting device 50 must be easily separated from the air-conditioning case 10 in a vehicle assembling line since the cable connecting device 50 is connected to the vehicle in the vehicle assembling step. However, the conventional cable connecting device 50 has a disadvantage in that the cable connecting device 50 is separated during the assembly process and the conveying process or is damaged by external shock due to its weak joining power.

SUMMARY OF THE INVENTION

Accordingly, the present invention has been made to solve the above-mentioned problems occurring in the prior arts, and it is an object of the present invention to provide an air conditioner for a vehicle, in which a means for fixing a cable connecting device is disposed integrally with an air-conditioning case, thereby having an optimized installation location, keeping rigidity, achieving weight lightening, and enhancing assemblability.

It is another object of the present invention to provide an air conditioner for a vehicle, which can prevent separation from the air-conditioning case when products are delivered since the cable connecting device is easily detached and has improved joining strength.

To accomplish the above object, according to the present invention, there is provided an air conditioner for a vehicle, which is to condition air in the interior of the vehicle by heating or cooling indoor air, including: a cable connecting device for connecting an actuating means of a controller of the vehicle to actuate a door inside an air-conditioning case with an actuating means of the air-conditioning case by a cable; and a cable fixing part for fixing the cable connecting device to the air-conditioning case.

According to the present invention, the air conditioner for a vehicle capable of delivering the cable connecting device at the same time with the air condition, reducing risks of conveyance costs, damage or loss, reinforcing hardness, and reducing manufacturing costs and weight.

Moreover, the air conditioner for a vehicle according to the present invention is very easy to combine the cable connecting device, and is easy to attach and detach the cable connecting the vehicle assembling process in a simple insertion way and enhances joining strength, thereby preventing the cable connecting device from being separated from the air-conditioning case and reducing a damage rate of products when the products are delivered.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
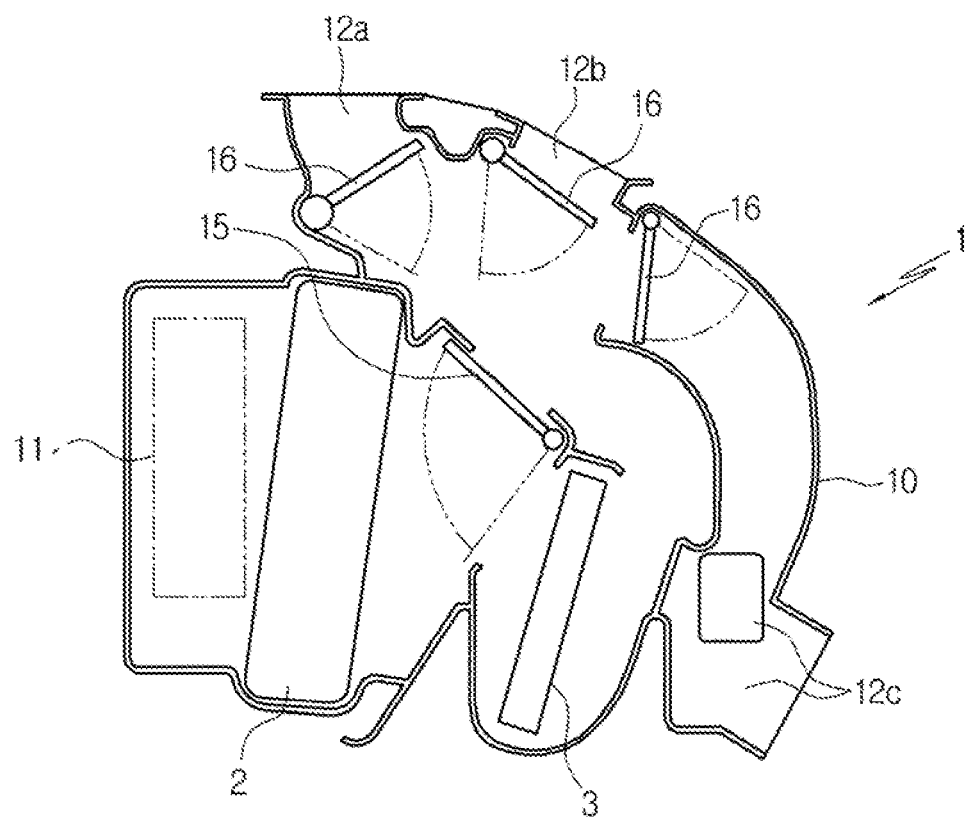
FIG. 1 is a sectional view showing a conventional air conditioner for a vehicle.
Figure 2:
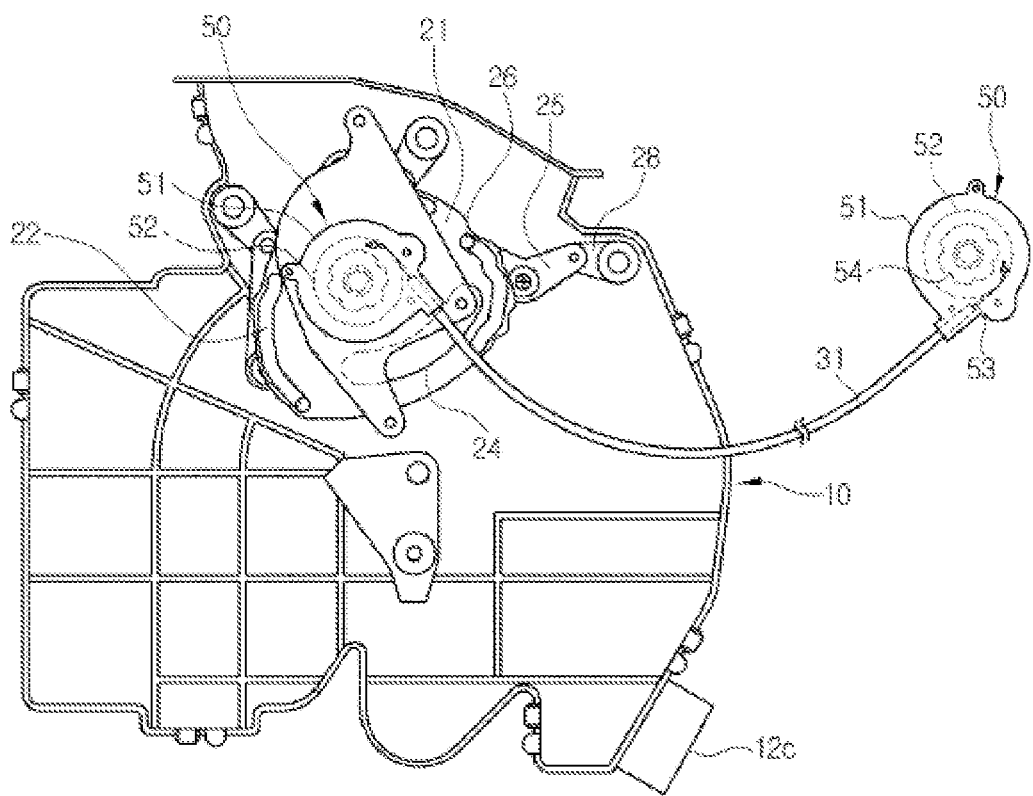
FIG. 2 is a side view showing an air-conditioning case in a state that a conventional cable connecting device is mounted.
Figure 3:
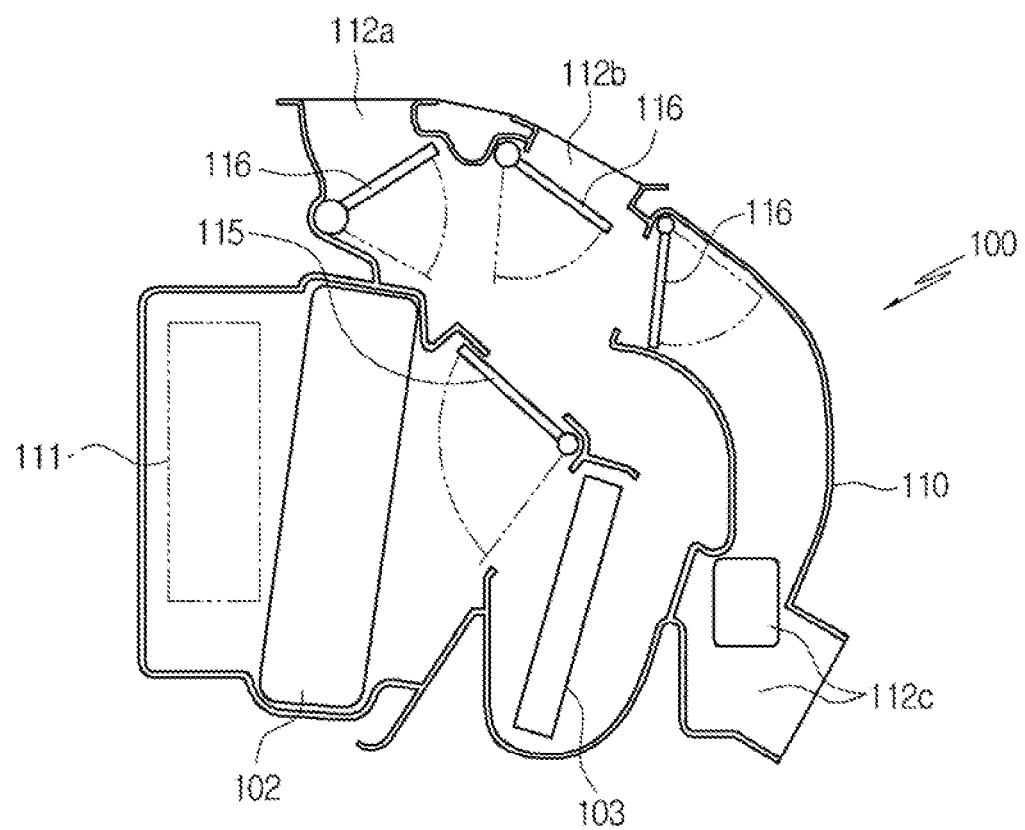
FIG. 3 is a sectional view of an air conditioner for a vehicle according to a first preferred embodiment of the present invention.
Figure 4:
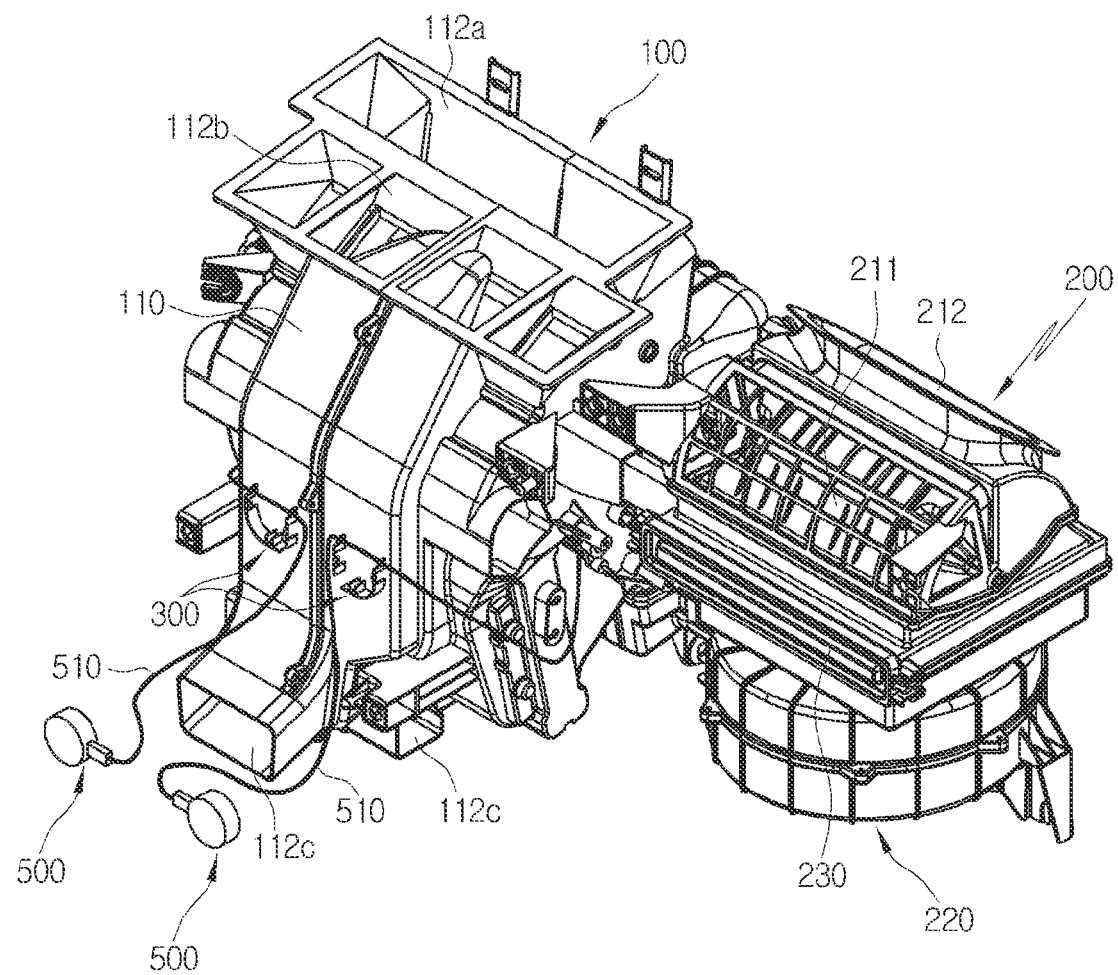
FIG. 4 is a perspective view of the air conditioner for a vehicle according to the first preferred embodiment of the present invention.
Figure 5:
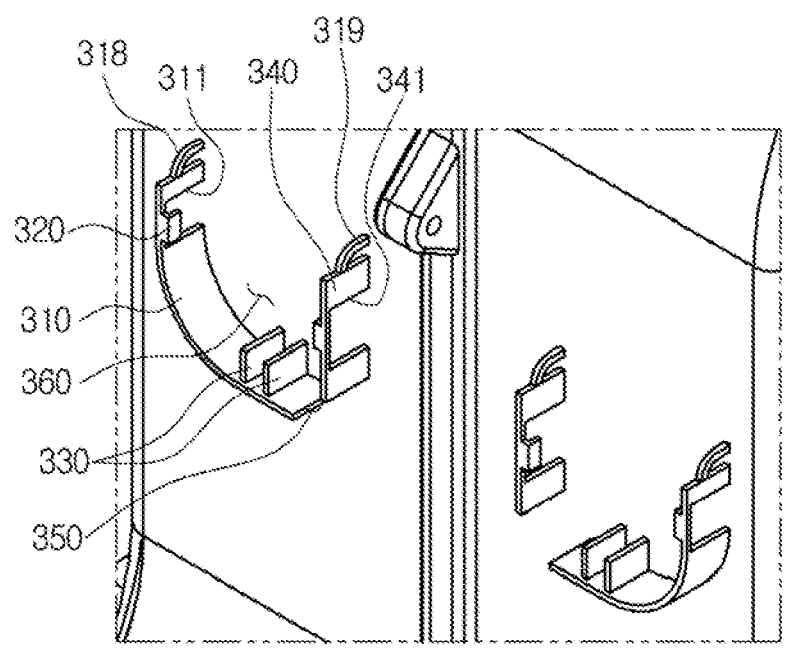
FIG. 5 is an enlarged perspective view of a cable fixing part of the air conditioner for a vehicle according to the first preferred embodiment of the present invention.
Figure 6:
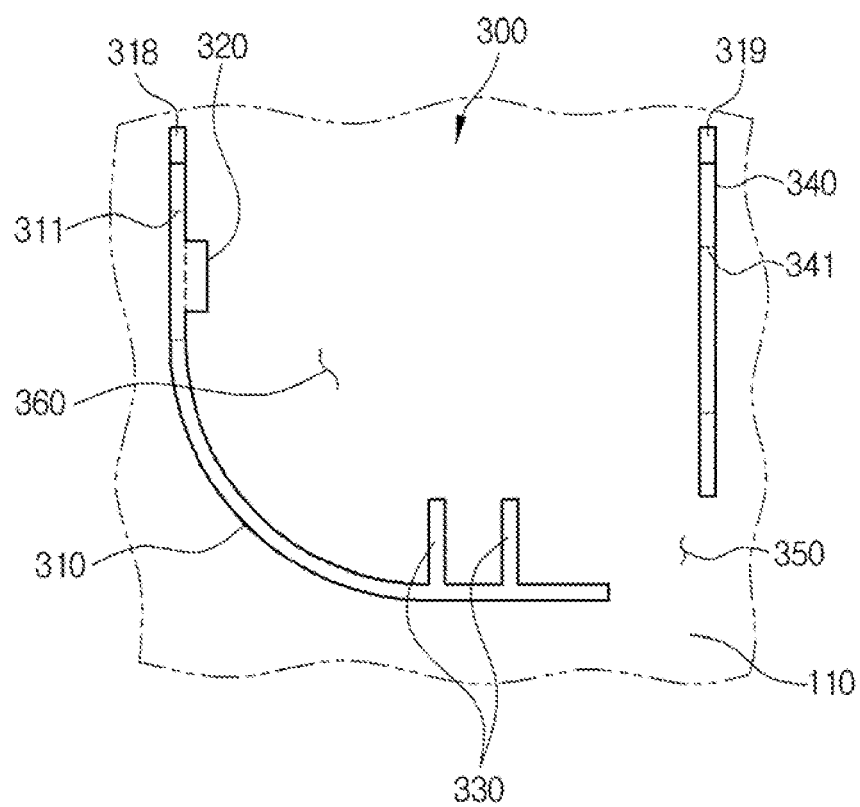
FIG. 6 is a front view of FIG. 5.
Figure 7:
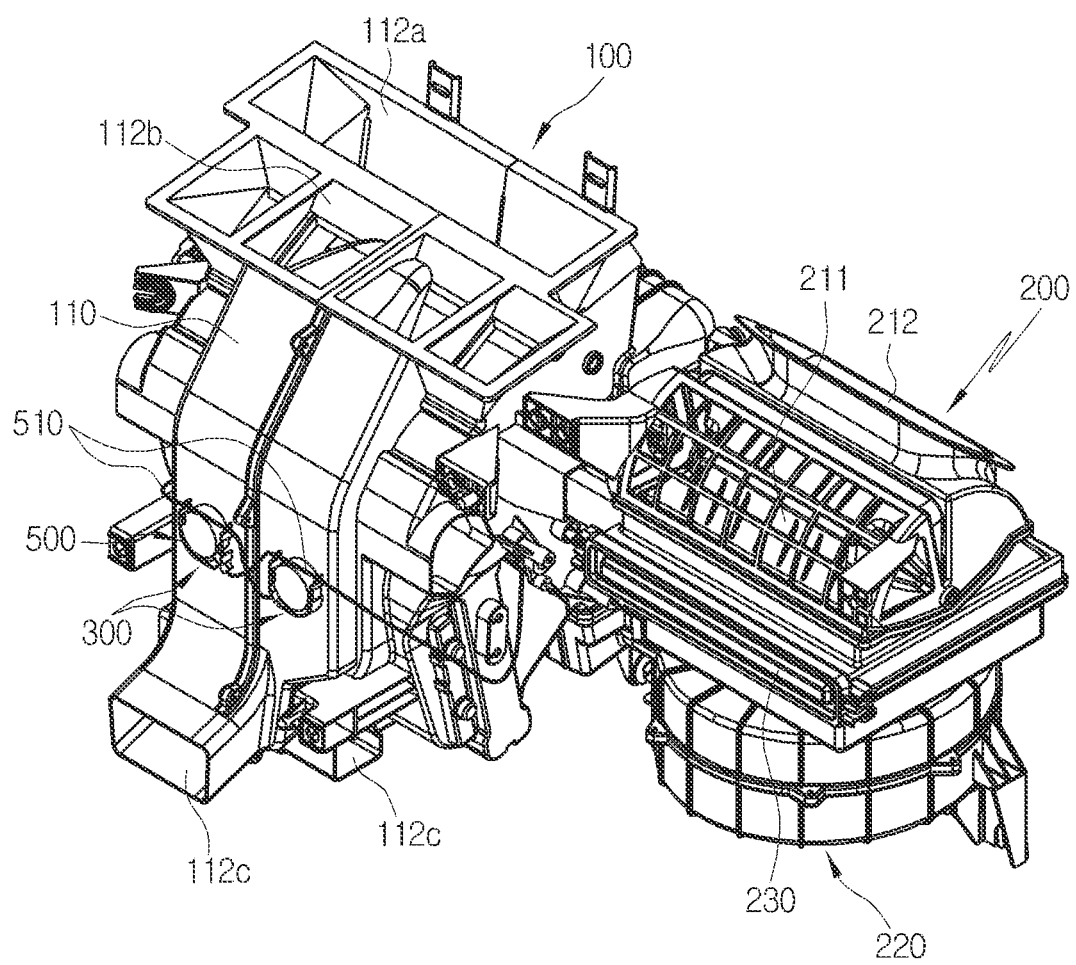
FIG. 7 is a perspective view showing a state that a cable connecting device is fixed to the air conditioner for a vehicle according to the first preferred embodiment of the present invention.

FIG. 3 is a sectional view of an air conditioner for a vehicle according to a first preferred embodiment of the present invention, FIG. 4 is a perspective view of the air conditioner for a vehicle according to the first preferred embodiment of the present invention, FIG. 5 is an enlarged perspective view of a cable fixing part of the air conditioner for a vehicle according to the first preferred embodiment of the present invention, FIG. 6 is a front view of FIG. 5, and FIG. 7 is a perspective view showing a state that a cable connecting device is fixed to the air conditioner for a vehicle according to the first preferred embodiment of the present invention.

As shown in FIGS. 3 to 7, the air conditioner 100 for a vehicle according to the first preferred embodiment of the present invention is to condition air of the interior of the vehicle by heating or cooling inside air, and includes an air-conditioning case 110, a blower 200, an evaporator 102, a heater core 103, and a temperature adjusting door 115.

The air-conditioning case 110 includes an air inflow port 111 formed at an inlet side, and a defrost vent 112*a*, a face vent 112*b*, and a floor vent 112*c* formed at an outlet side and adjusted in the degree of opening by mode doors 116.

The blower 200 is connected to the air inflow port 111 of the air-conditioning case 110 to blow indoor air or outdoor air. An indoor air inlet 211 for introducing indoor air and an outdoor air inlet 212 for introducing outdoor air are formed in an intake case of the blower 200. A blower unit 220 having a blower wheel and a blower motor is disposed on a scroll case of the blower 200, and an air filter 230 is disposed at an upper portion of the blower wheel.

The evaporator 102 and the heater core 103 are mounted inside the air-conditioning case 110 in order. The temperature adjusting door 115 is mounted between the evaporator 102 and the heater core 103 to adjust the degree of opening of a cold air passageway bypassing the heater core 103 and a warm air passageway passing through the heater core 103.

The mode door 116 includes a defrost door for adjusting the degree of opening of the defrost vent 112*a*, a vent door for adjusting the degree of opening of the face vent 112*b*, and a floor door for adjusting the degree of opening of the floor vent 112*c*. The temperature adjusting door 115 and the mode doors 116 are connected to an actuator mounted on the outer face of the air-conditioning case 110 and rotates to adjust the degree of opening of the cold air passageway and the warm air passageway or adjust the degree of opening of passageways facing the vents 112a to 112c.

In order to control the air conditioner, a controller is mounted on a center fascia panel of the vehicle. The controller has a structure that a switch is mounted on a housing. The air conditioner for a vehicle has a cable connecting device 500. The cable connecting device 500 connects an actuating means of a vehicle controller and an actuating means of the air-conditioning case 110 by a cable 510 in order to operate the door in the air-conditioning case 110.

The cable connecting device 500 is disposed at the rear side of the housing of the controller, and can operate the cable 510 when a knob is rotated. That is, the cable connecting device 500 connects an actuating means of a vehicle controller and an actuating means of the air-conditioning case 110 by a cable 510, of which the outer circumferential surface is surrounded by a tube, in order to operate the door in the air-conditioning case 110.

The cable connecting device 500 includes: a pulley receiving part formed therein so that a pulley is rotatably inserted into the pulley receiving part; and a casing disposed at one side thereof so that one end portion of the cable 510 is inserted into the pulley receiving part. A detent protrusion is elastically mounted inside the casing through an elastic member, and a detent part protruding from one side of the pulley and having a plurality of detent grooves formed in a circumferential direction on the outer circumferential surface so that the detent protrusion is resiliently caught to the detent part.

The air conditioner for a vehicle according to the first preferred embodiment of the present invention includes a cable fixing part 300. The cable fixing part 300 is to fix the cable connecting device 500 to the air-conditioning case 110, and is formed integrally to the air-conditioning case 110. As described above, because the cable fixing part 300 is formed integrally with the air-conditioning case 110, there is no need to add a protecting means for protecting the cable connecting device 500 when the air conditioner is conveyed, so conveyance costs are reduced.

The cable fixing part 300 has a temporary mounting structure that the cable connecting device 500 is assembled and disassembled. The cable fixing part 300 easily fixes the cable connecting device 500 to the air-conditioning case 110 when the air conditioner is conveyed. If the cable connecting device 500 is separated from the air-conditioning case 110 for a reason that the air conditioner is assembled to the vehicle, the cable connecting device 500 is easily separated. Therefore, time and expenses required for fixing the cable connecting device 500 to the air-conditioning case 110 and separating the cable connecting device 500 from the air-conditioning case 110 can be reduced.

The cable fixing part 300 is formed in a rib shape protruding outwardly from the air-conditioning case 110. The cable fixing part 300 of the rib shape is injection-molded integrally with the outer face of the air-conditioning case 110. Therefore, the cable fixing part 300 functions to fix the cable connecting device 500 and to reinforce the strength of the air-conditioning case 110.

The cable fixing part 300 fixes the cable connecting device 500 connected to the actuating means of the controller. The cable connecting devices 500 are disposed at the actuating means of the air-conditioning case and the actuating means of the controller, and the cable connecting device disposed at the actuating means of the air-conditioning case and the cable connecting device disposed at the actuating means of the controller are connected with each other through the cable 510.

When the air conditioner is conveyed, the cable connecting device disposed at the actuating means of the air-conditioning case is fixed to the air-conditioning case without needing additional fixing means to be delivered. However, because the cable connecting device disposed at the actuating means of the controller is combined with the controller of a vehicle panel when being assembled, the cable connecting device requires additional means to be fixed to the air-conditioning case 110 when being delivered. Therefore, the cable fixing part 300 fixes the cable connecting device 500 connected to the actuating means of the controller, so that the air conditioner can be delivered without additional fixing means.

The cable fixing part 300 is formed on a front face of the rear of the air-conditioning case 110 in front of the heater core 103, namely, in the back-and-forth direction of the vehicle. As described above, because the cable fixing part 300 is formed on the front face of the rear of the air-conditioning case 110, the air conditioner for a vehicle according to the present invention does not need additional space for forming the cable fixing part 300 and can reduce damage and loss of products.

The cable fixing part 300 includes a side wall part. The side wall part extends from the outer face of the air-conditioning case 110, comes into contact with the side of the cable connecting device 500 and has a hook structure.

The side wall part includes a first side wall part 310 and a second side wall part 340. The first side wall part 310 and the second side wall part 340 are spaced apart from each other at a predetermined interval in a lateral width direction of the vehicle, and the cable connecting device 500 is elastically supported between the first side wall part 310 and the second side wall part 340. An opening part 350 allowing the cable 510 of the cable connecting device 500 to pass through the opening part 350 is formed inclined between the first side wall part 310 and the second side wall part 340. In the above, the lateral width direction of the vehicle is a right and left direction in FIG. 6.

A predetermined space part 360 is formed between the first side wall part 310 and the second side wall part 340 to seat the cable connecting device 500. That is, the first side wall part 310 and the second side wall part 340 are spaced apart from each other in the lateral width direction of the vehicle and elastically support the right and left sides of the cable connecting device 500. The first side wall part 310 extends to correspond to the shape of the cable connecting device 500 to surround the side of the cable connecting device 500, and can support a part of a lower surface or an upper surface as well as the side of the width direction of the cable connecting device 500.

The opening part 350 formed between the first side wall part 310 and the second side wall part 340 is formed in a diagonal direction on the front view of FIG. 6, namely, in an inclined direction to the spaced direction of the first side wall part 310 and the second side wall part 340. Thereby, the cable connecting device 500 supports a portion to draw out the cable 510 of the cable connecting device 500 in a state that the cable connecting device 500 is fixed to the cable fixing part 300. In this instance, the cable connecting device 500 supports to be inclined relative to the elastically support direction of the side wall part and lowers possibility of separation, so that the cable connecting device 500 can be firmly fixed.

The side wall part has one or more sliming grooves 311 and 341. The sliming grooves 311 and 341 are perforated in a thickness direction of the side wall part. That is, the sliming groove 311 is formed in the first side wall part 310, and the sliming groove 341 is formed in the second side wall part 340. The sliming grooves 311 and 341 are perforated in the side wall part in the thickness direction, namely, in the lateral width direction of the vehicle. Through the structure of the slimming grooves 311 and 341, the present invention can minimize weight, reduce manufacturing costs, and reinforce rigidity of the rib.

The side wall part includes a separation preventing part 320 protruding and extending in the width direction of the vehicle to support the front face of the cable connecting device 500. The separation preventing part 320 is formed at an end portion of the front face of the side wall part of the cable fixing part 300 to support the end portion of the front face of the cable connecting device 500 in the state that the cable connecting device 500 is fixed.

Moreover, the side wall part further includes a protruding part 330 for reinforcing rigidity and increasing fixing force of the cable connecting device 500. The structure of the separation preventing part 320 prevents separation and increases fixing force in the state that the cable connecting device 500 is fixed to the cable fixing part 300.

The cable fixing part 300 is arranged at the opposite side to the side where a door actuating part for actuating the door is arranged. That is, the door actuating part is arranged at the side of the air-conditioning case 110, and the cable fixing part 300 is arranged on the front face of the air-conditioning case 110. Such a structure prevents interference between the door actuating part and the cable fixing part 300 and makes efficient utilization of a space possible.

In this instance, the side of the air-conditioning case 110 is the left side or the right side in the width direction of the vehicle, and is one side of the air-conditioning case 110, which is the opposite side to the side connected with the blower 200. Additionally, the front face of the air-conditioning case 110 is the rear in the back-and-forth direction of the vehicle, and is the side facing the interior of the vehicle.

Referring to FIGS. 5 and 6, the cable fixing part 300 includes hook portions 318 and 319 for fixing the cable 510. It is preferable that two hook portions 318 and 319 be disposed per one cable 510. One of the hook portions 318 and 319 is disposed on the first side wall part 310 and the other one is disposed on the second side wall part 340. The hook portions 318 and 319 is bent toward the outer face of the air-conditioning case 110 from the end portion of the side wall part to be formed in a hook shape. The cable 510 is fit and fixed to the hook portions 318 and 319, and is fixed at two places in order to provide a table fixing force. Additionally, the cable 510 can be easily separated from the hook portions 318 and 319.

Figure 8:
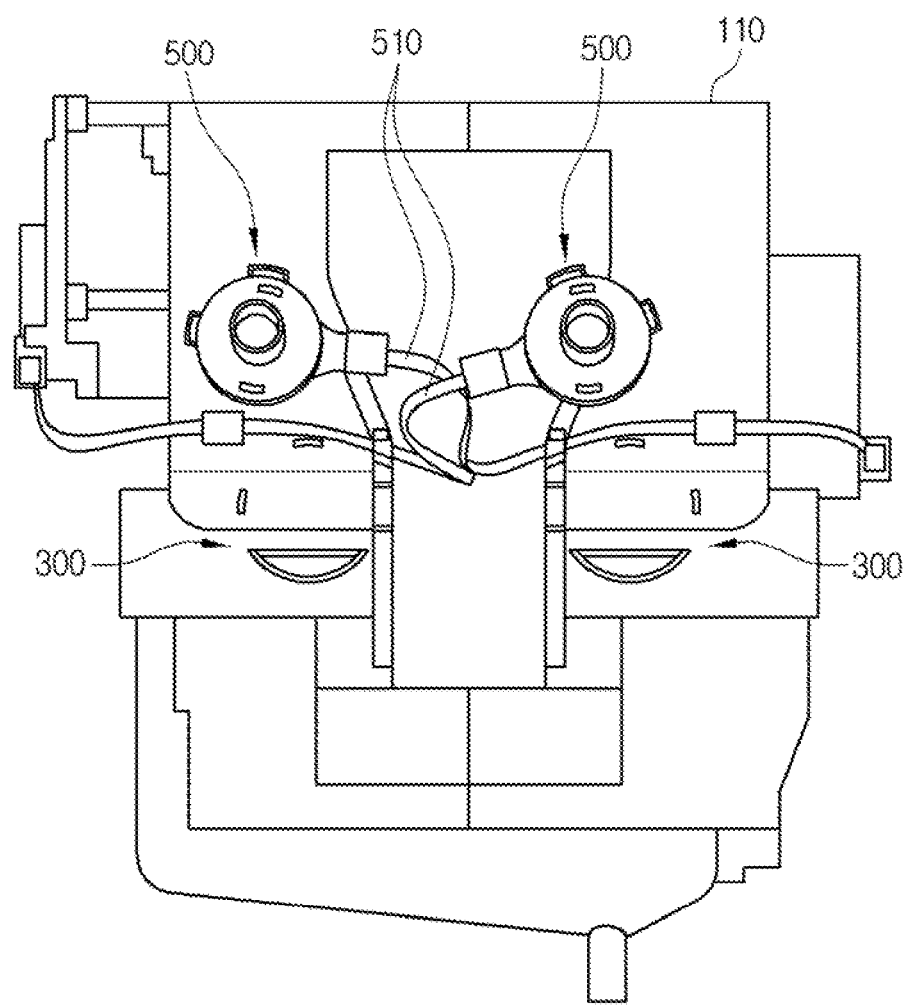
FIG. 8 is a front view of an air conditioner for a vehicle according to a second preferred embodiment of the present invention.
Figure 9:
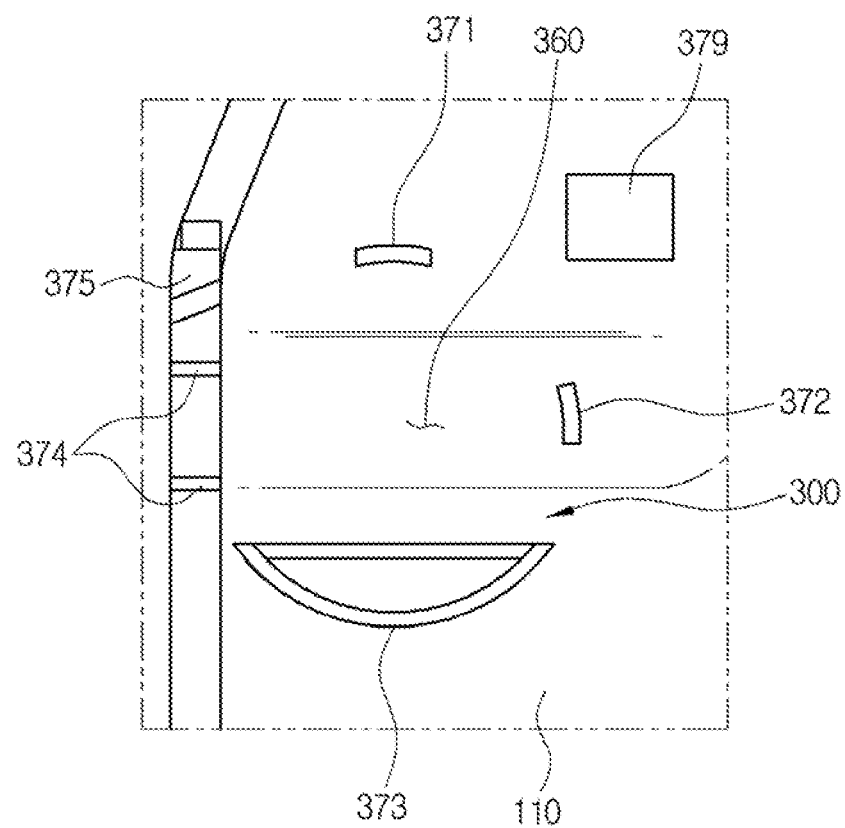
FIG. 9 is a front view showing a cable fixing part according to the second preferred embodiment of the present invention.
Figure 10:
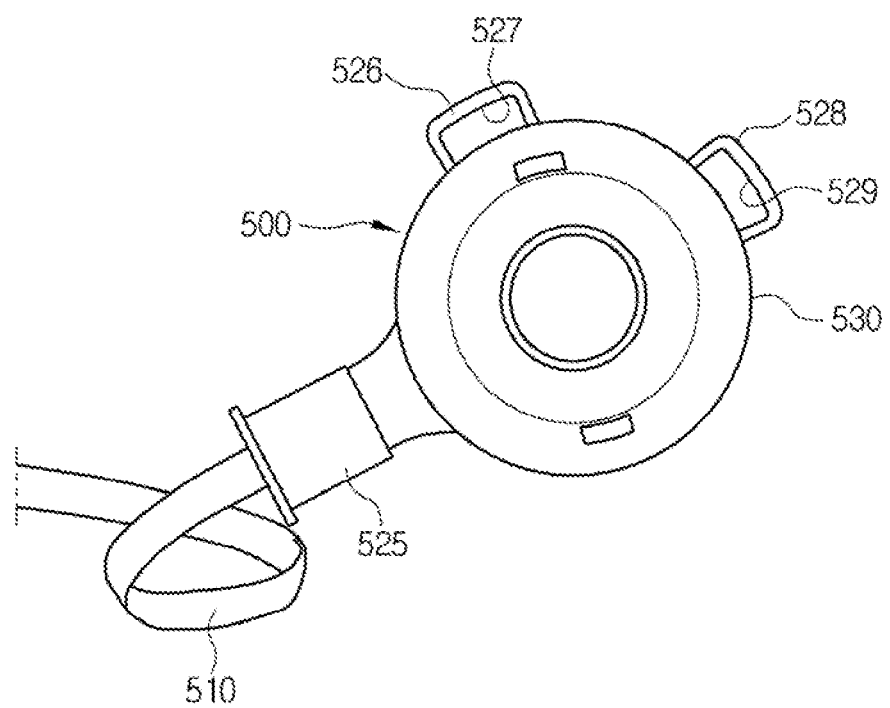
FIG. 10 is a front view showing a cable connecting device according to the second preferred embodiment of the present invention.
Figure 11:
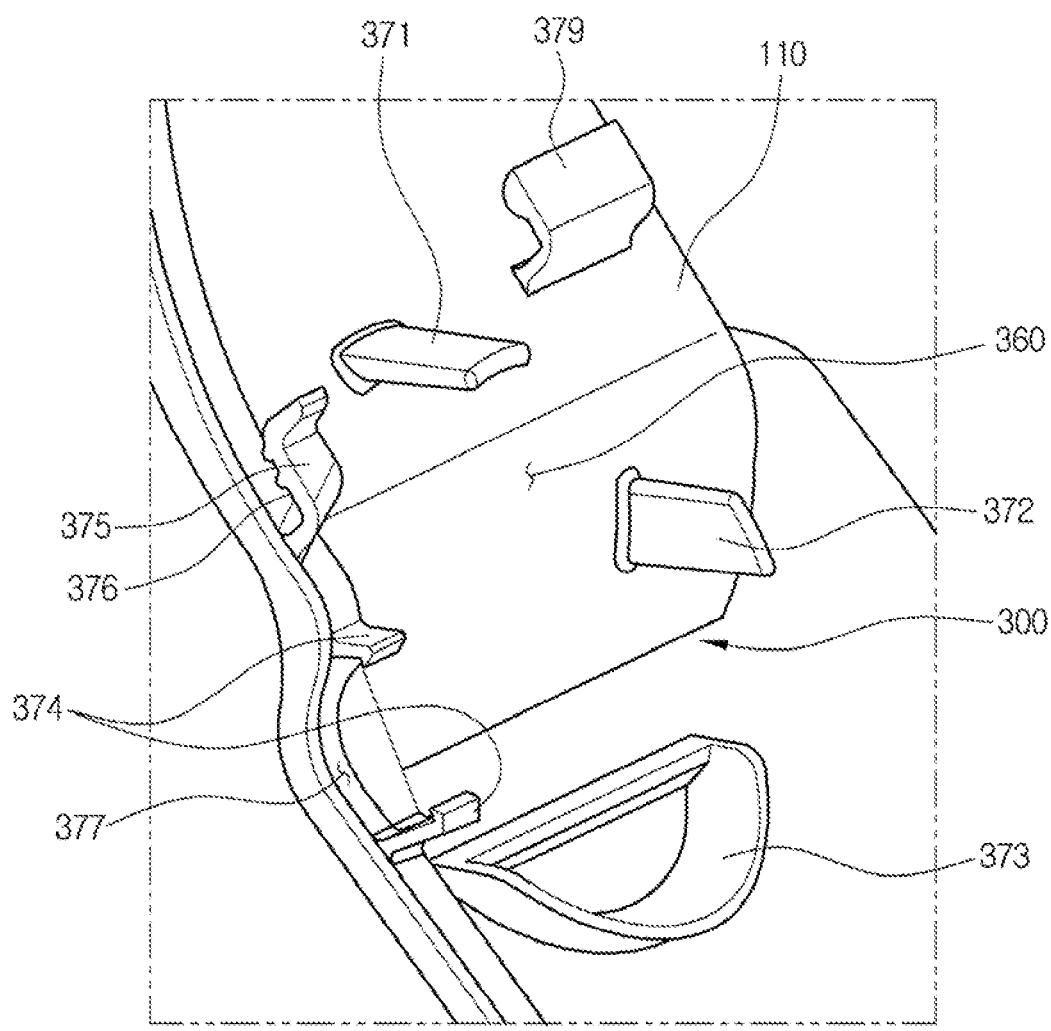
FIG. 11 is a perspective view showing a cable fixing part according to the second preferred embodiment of the present invention.
Figure 12:
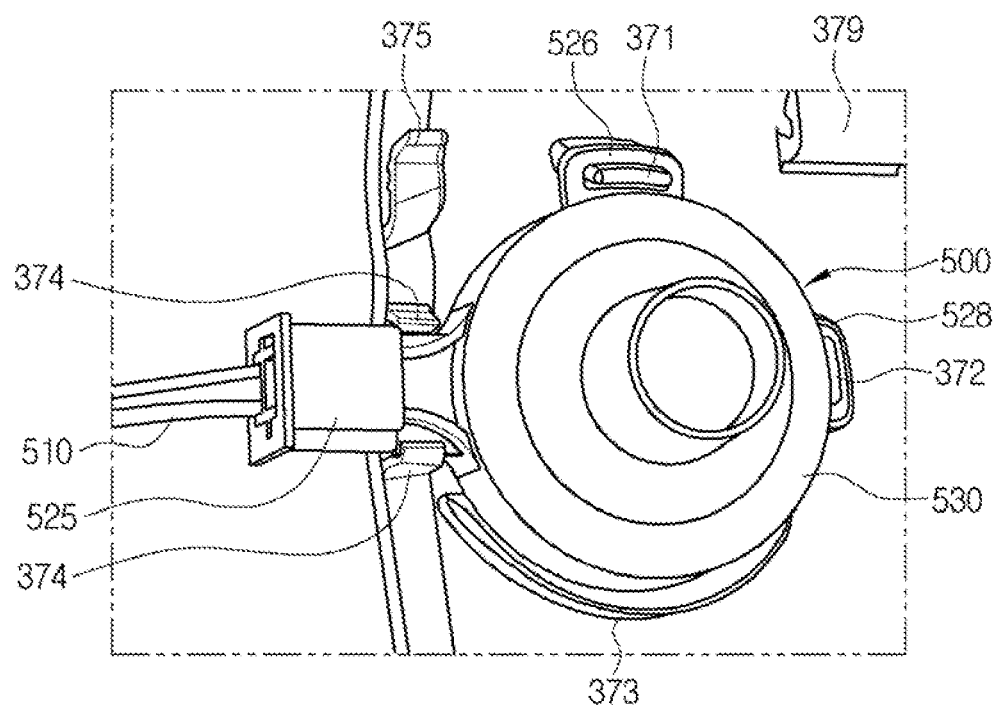
FIG. 12 is a perspective view showing a state that the cable connecting device is combined with the cable fixing part according to the second preferred embodiment of the present invention.
Figure 13:
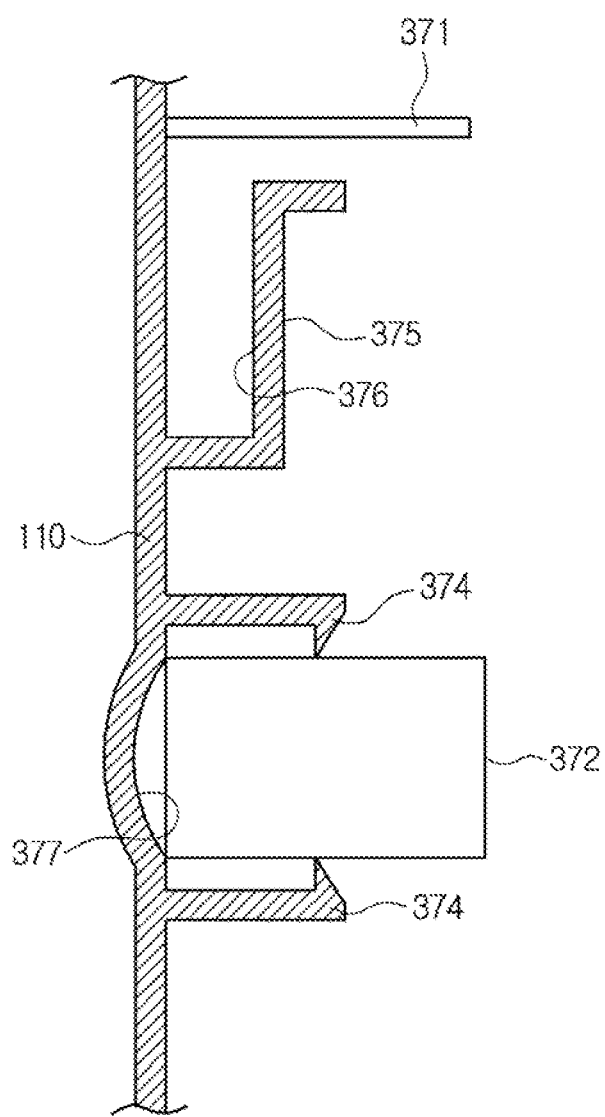
FIG. 13 is a sectional view showing the cable fixing part according to the second preferred embodiment of the present invention.
Figure 14:
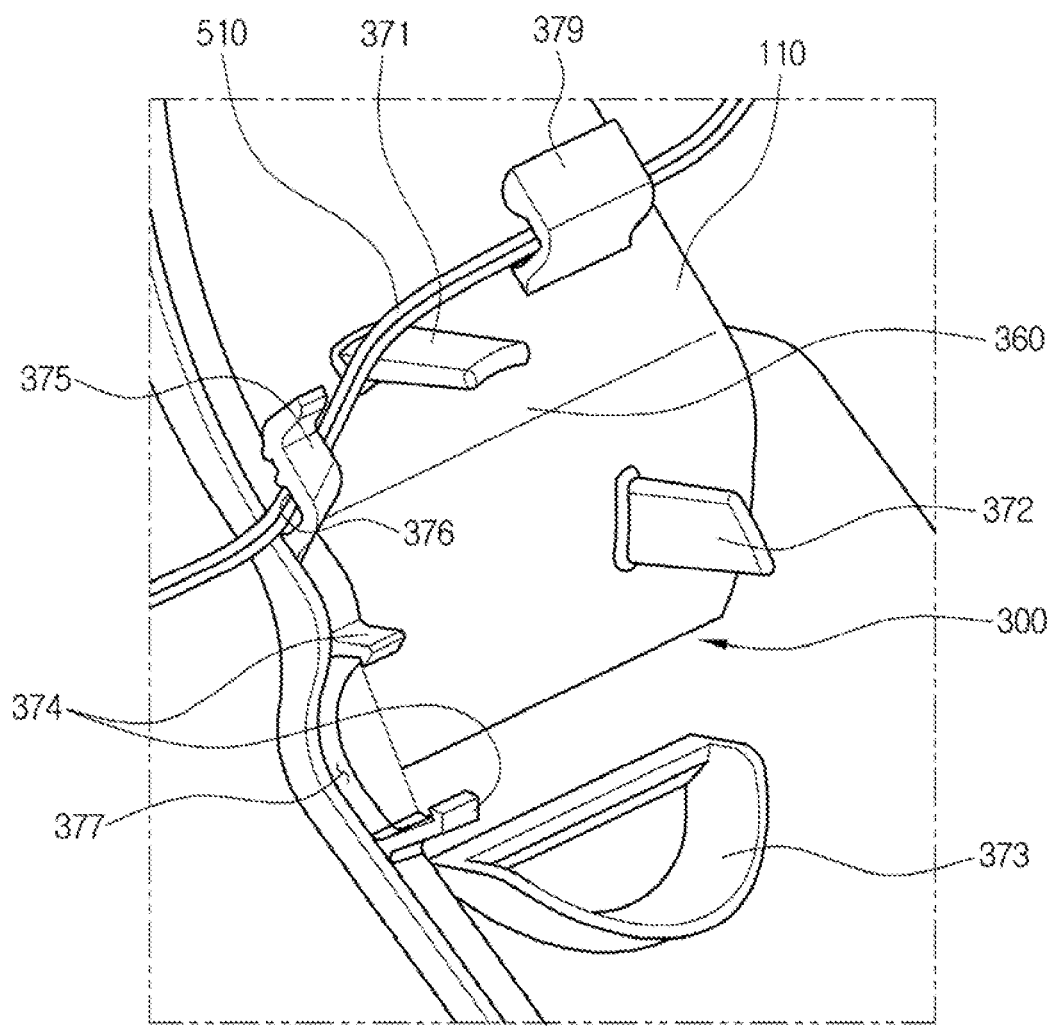
FIG. 14 is a perspective view showing a state that a cable is combined with the cable fixing part according to the second preferred embodiment of the present invention.
Figure 15:
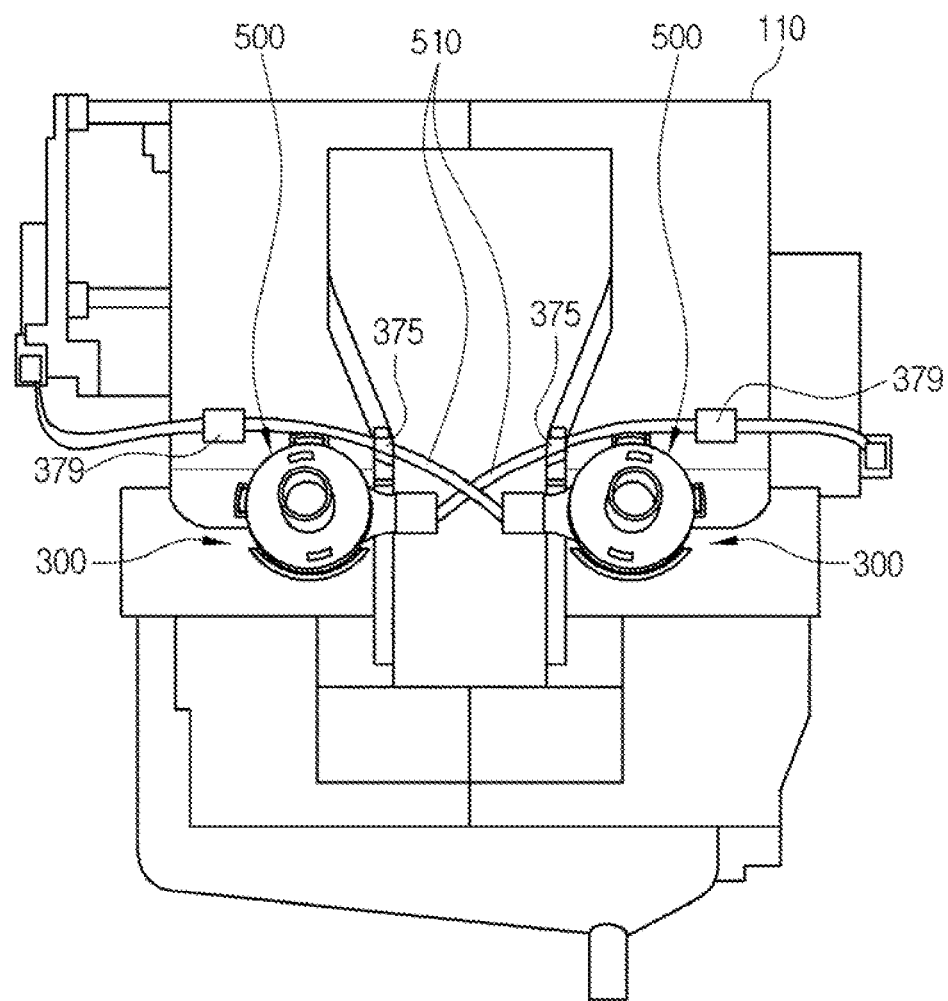
FIG. 15 is a front view showing the air conditioner for a vehicle in a state that the cable connecting device according to the second preferred embodiment is combined with the cable fixing part.

FIG. 8 is a front view of an air conditioner for a vehicle according to a second preferred embodiment of the present invention, FIG. 9 is a front view showing a cable fixing part according to the second preferred embodiment of the present invention, FIG. 10 is a front view showing a cable connecting device according to the second preferred embodiment of the present invention, FIG. 11 is a perspective view showing a cable fixing part according to the second preferred embodiment of the present invention, FIG. 12 is a perspective view showing a state that the cable connecting device is combined with the cable fixing part according to the second preferred embodiment of the present invention, FIG. 13 is a sectional view showing the cable fixing part according to the second preferred embodiment of the present invention, FIG. 14 is a perspective view showing a state that a cable is combined with the cable fixing part according to the second preferred embodiment of the present invention, and FIG. 15 is a front view showing the air conditioner for a vehicle in a state that the cable connecting device according to the second preferred embodiment is combined with the cable fixing part.

Hereinafter, in the following description, the vertical direction in FIG. 8 is a height direction of the vehicle, the lateral direction is the width direction of the vehicle, and the protruding direction in the drawings is the back-and-forth direction of the vehicle. Each direction is defined for convenience of description, and the present invention is not limited to the above-mentioned directions.

Referring to FIGS. 8 to 15, the air conditioner for a vehicle according to the second preferred embodiment of the present invention includes a cable connecting device 500 and a cable fixing part 300. The cable fixing part 300 includes a first fixing part, a second fixing part, and a lower end supporting part 373. Moreover, the cable connecting device 500 includes a disc-shaped holder 530 having a buckle and a shaft combined therein, and a cable connecting part 525 extending from one side of the holder 530 in a radial direction to connect a cable 510.

The first fixing part fixes the cable connecting part 525 of the cable connecting device 500, and the second fixing part fixes a holder 530 of the cable connecting device 500. The lower end supporting part 373 supports the side of the disc-shaped holder 530.

The second fixing part is fit and fixed to the holder 530 of the cable connecting device 500 in the back-and-forth direction of the vehicle. The first fixing part restricts the cable connecting part 525 in the back-and-forth direction of the air-conditioning case 110 in order to prevent the cable connecting device 500 from being separated when the cable connecting device 500 is combined with the cable fixing part 300.

The second fixing part has a protrusion protruding in the back-and-forth direction of the vehicle from the outer face of the air-conditioning case 110. Moreover, a bracket part having a fitting hole is disposed on the holder 530 of the cable connecting device 500 to be combined with the protrusion part.

The bracket part includes a first bracket part 528 and a second bracket part 526. The first bracket part 528 is formed in a direction to face the cable connecting part 525, and the second bracket part 526 is arranged in a circumferential direction relative to the first bracket part 528 to be spaced apart from the first bracket part 528. The first bracket part 528 and the second bracket part 526 extend in a radial direction from the outer circumferential surface of the holder 530. A fitting hole 529 and another fitting hole 527 are respectively formed in the first bracket part 528 and the second bracket part 526 to penetrate the first bracket part 528 and the second bracket part 526 in the back-and-forth direction of the vehicle.

The protrusion part includes a first protrusion part 372 inserted into the fitting hole 529 of the first bracket part 528 and a second protrusion part 371 inserted into the fitting hole 527 of the second bracket part 526. The first protrusion part 372 and the second protrusion part 371 extend from the outer face of the air-conditioning case 110 toward the rear of the vehicle. The second protrusion part 371 is arranged to face the lower end supporting part 373 in the height direction (vertical direction) of the vehicle, and the first protrusion part 372 is arranged to face the first fixing part in the width direction of the vehicle (lateral direction).

The first fixing part includes an elastically supporting part 374. The elastically supporting part 374 elastically supports both sides of the cable connecting part 525, and blocks and restricts at least a portion of the cable connecting part 525 in the back-and-forth direction of the vehicle. The elastically supporting part 374 includes a concave seating groove 377 for seating the cable connecting part 525 thereon. The elastically supporting part 374 includes a pair of hook-shaped members which are spaced apart from each other at a predetermined interval in the height direction, and has elastically restoring force in a direction that the hook-shaped members are retracted. When the cable connecting part 525 is pressed toward the elastically supporting part 374, the hook-shaped members are spread, and then, are retracted again by the elastically restoring force to fix the cable connecting part 525.

The first protrusion part 372 and the second protrusion part 371 restrict the height direction and the width direction of the vehicle when the holder 530 of the cable connecting device 500 is fit. The elastically supporting part 374 fixes the cable connecting part 52 of the cable connecting device 500 to restrict the back-and-forth direction of the vehicle. A predetermined space part 360 is formed at a position surrounding by the lower end supporting part 373, the first protrusion part 372, the second protrusion part 371 and the elastically supporting part 374, and the cable connecting device 500 is mounted in the space part 360.

Moreover, the cable fixing part 300 includes cable insertion parts 375 and 379 for fixing the cable 510. The cable insertion parts 375 and 379 are arranged at upper portions of the first fixing part and the second fixing part. In this instance, the cable 510 of the cable connecting device 500 of the left side is fixed to the cable insertion parts 375 and 379 of the right side, and the cable 510 of the cable connecting device 500 of the right side is fixed to the cable insertion parts 375 and 379 of the left side.

One of the cable insertion parts 375 and 379 has a seating groove 376 formed therein to insert the cable 510 and is arranged at the upper portion of the elastically supporting part 374. The other one of the cable insertion parts 375 and 379 is arranged at an upper portion adjacent to the second protrusion part 371. The cables 510 of the cable connecting devices 500 are fixed to be deviated from each other in the right and left direction, so that the cable 510 has at least one torsional section, and the torsional power of the cable 510 provides assistance to fix the cable connecting device 500. Therefore, the present invention enhances fixing force of the cable connecting device 500.

The cable connecting device 500 is easily combined with the cable fixing part 300 in a one-touch way when being fit to the first protrusion part 372 and the second protrusion part 371 of the air-conditioning case 110 and being pressed toward the elastically supporting part 374 with a predetermined power. The cable connecting device 500 can be easily separated from the cable fixing part when a user spreads a little with a predetermined power. Since the first fixing part and the second fixing part firmly fix the cable connecting device 500 to the air-conditioning case 110, the present invention enhances the joining strength and prevents damage caused by separation of the cable connecting device 500 when being conveyed.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims.

What is claimed is:

1. An air conditioner for a vehicle, which is to condition air in the interior of the vehicle by heating or cooling indoor air, the air conditioner comprising:
   a cable connecting device for connecting an actuating means of a controller of the vehicle to actuate a door inside an air-conditioning case with an actuating means of the air-conditioning case by a cable; and
   a cable fixing part for fixing the cable connecting device to the air-conditioning case;
   wherein the cable fixing part includes a first fixing part for fixing a cable connecting part of the cable connecting device and a second fixing part for fixing a holder of the cable connecting device;
   wherein the second fixing part has a protrusion part protruding in a back-and-forth direction of the vehicle from an outer face of the air-conditioning case;
   wherein at least one bracket part installed on the holder of the cable connecting device forms at least one fitting hole that is coupled to the protrusion part; and
   wherein the first fixing part includes an elastically supporting part which elastically supports two sides of the cable connecting part in order to block and restrict movement of at least a portion of the cable connecting part in the back-and-forth direction of the vehicle.

2. The air conditioner according to claim 1, wherein the cable fixing part further includes a lower end supporting part for supporting a lower portion of the holder of the cable connecting device.

3. The air conditioner according to claim 1, wherein the at least one bracket part includes: a first bracket part formed in a direction facing away from the cable connecting part, and a second bracket part spaced apart from first bracket part in a circumferential direction, the first and second bracket parts each have a fitting hole, and the protrusion part includes a first protrusion part inserted into the fitting hole of the first bracket part and a second protrusion part inserted into the fitting hole of the second bracket part.

4. An air conditioner for a vehicle, which is to condition air in the interior of the vehicle by heating or cooling indoor air, the air conditioner comprising:
   a left cable connecting device and a right cable connecting device each for connecting an actuating means of a controller of the vehicle to actuate a door inside an air-conditioning case with an actuating means of the air-conditioning case by a cable; and
   a left cable fixing part and a right cable fixing part spaced from one another and each for fixing one of the left and right cable connecting devices to the air-conditioning case;
   wherein each of the left and right cable fixing parts includes a first fixing part for fixing a cable connecting part of one of the left and right cable connecting devices and a second fixing part for fixing a holder of one of the left and right cable connecting devices;
   wherein each of the left and right cable fixing parts further includes a pair of cable insertion parts, and at least one of the cable insertion parts of the pair of cable insertion parts is arranged above the first fixing part of one of the left and right cable fixing parts and at least one of the cable insertion parts of the pair of cable insertion parts is arranged above the second fixing part of one of the left and right cable fixing parts; and
   wherein a cable of the left cable connecting device is fixed to the cable insertion parts of the right cable fixing part, and a cable of the right cable connecting device is fixed to the cable insertion parts of the left cable fixing part, so that torsional power of the cables provides assistance to fix the left and right cable connecting devices.

5. An air conditioner for conditioner air in an interior of a vehicle, comprising:

a vehicle controller including an actuating means;

an air-conditioning case containing a door for adjusting a degree of opening of at least one passageway in the air-conditioning case;

the air-conditioning case including an actuating means for actuating the door;

a cable connecting device for connecting the actuating means of the controller and the actuating means of the air-conditioning case by a cable for providing actuation of the door;

a cable fixing part for fixing the cable connecting device to the air-conditioning case;

the cable fixing part including a first fixing part for fixing a cable connecting part of the cable connecting device and a second fixing part for fixing a holder of the cable connecting device;

the second fixing part having a protrusion part protruding from an outer face of the air-conditioning case;

a bracket part installed on the holder of the cable connecting device forming a fitting hole that is coupled to the protrusion part; and the first fixing part including an elastically supporting part which elastically supports two sides of the cable connecting part in order to block and restrict movement of at least a portion of the cable connecting part.

* * * * *